US010860071B2

(12) United States Patent
Munjal et al.

(10) Patent No.: US 10,860,071 B2
(45) Date of Patent: Dec. 8, 2020

(54) THERMAL EXCURSION DETECTION IN DATACENTER COMPONENTS

(71) Applicant: MICROSOFT TECHNOLOGY LICENSING, LLC, Redmond, WA (US)

(72) Inventors: Ashish Munjal, Bellevue, WA (US); Lee W. Progl, Carnation, WA (US); Prasad Ayyalasomayajula, Redmond, WA (US); Uuganjargal Khanna, Kirkland, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 294 days.

(21) Appl. No.: 15/587,016

(22) Filed: May 4, 2017

(65) Prior Publication Data
US 2018/0321719 A1   Nov. 8, 2018

(51) Int. Cl.
*G06F 1/20* (2006.01)
*G06F 13/40* (2006.01)
*G06F 11/30* (2006.01)
*G06F 11/36* (2006.01)

(52) U.S. Cl.
CPC .......... *G06F 1/206* (2013.01); *G06F 11/3058* (2013.01); *G06F 11/3648* (2013.01); *G06F 13/4068* (2013.01)

(58) Field of Classification Search
CPC ............. G06F 11/3058; G06F 11/3055; G06F 11/3065; G06F 11/3648
See application file for complete search history.

(56) References Cited

U.S. PATENT DOCUMENTS

| 8,964,374 | B1 | 2/2015 | Sheng et al. |
| 9,310,784 | B1 | 4/2016 | Roy |
| 9,338,928 | B2 | 5/2016 | Lehman |

(Continued)

OTHER PUBLICATIONS

Kelley, et al., "Data center efficiency and it equipment reliability at wider operating temperature and humidity ranges", In White Paper of IBM, Jan. 1, 2017, pp. 1-37.
(Continued)

*Primary Examiner* — Jigar P Patel
(74) *Attorney, Agent, or Firm* — Ray Quinney & Nebeker, P.C.; Thomas M. Hardman; Brandon K. Roper

(57) ABSTRACT

A fully out-of-band, automated process provides centralized, concurrent in-system cluster-level/hyper-scale CPU thermal excursion signature detection based on system event log (SEL) content. A chassis manager within a hyper-scale cluster operates as the initiator of a cluster-level SEL collection and analysis operation. The master chassis manager initiates a collect and analyze operation, which gets relayed to every chassis manager within the cluster. Every recipient chassis manager then further propagates the collect and analyze operation request to each of the server blades hosted within the chassis. A Baseboard Management Controller (BMC) on each server hosted within the chassis receives a cluster SEL read request from the chassis manager through out-of-band communication interfaces. The BMC forwards SEL data for the server back to the chassis manager, which analyzes the data received from all the servers on the chassis and then sends the results to next manager in the hierarchy.

22 Claims, 7 Drawing Sheets

(56) References Cited

U.S. PATENT DOCUMENTS

| | | | | |
|---|---|---|---|---|
| 2006/0004824 A1* | 1/2006 | Hsieh | ................... | G06F 11/2294 |
| | | | | 709/223 |
| 2007/0089446 A1* | 4/2007 | Larson | ................... | G06F 1/206 |
| | | | | 62/259.2 |
| 2010/0085196 A1 | 4/2010 | Stiver et al. | | |
| 2011/0016342 A1 | 1/2011 | Rowan et al. | | |
| 2012/0185624 A1* | 7/2012 | Dang | ..................... | G06F 13/40 |
| | | | | 710/104 |
| 2012/0215373 A1 | 8/2012 | Koblenz et al. | | |
| 2013/0073245 A1 | 3/2013 | Bhagwat et al. | | |
| 2014/0082142 A1* | 3/2014 | Geffin | ................... | G06F 13/385 |
| | | | | 709/217 |
| 2014/0195704 A1* | 7/2014 | Bhatia | ..................... | G06F 13/42 |
| | | | | 710/105 |
| 2014/0240919 A1* | 8/2014 | Alshinnawi | ........ | H05K 7/20145 |
| | | | | 361/679.49 |
| 2015/0215343 A1* | 7/2015 | Itkin | ....................... | H04L 41/04 |
| | | | | 709/217 |
| 2016/0173351 A1* | 6/2016 | Dubal | ..................... | H04L 41/04 |
| | | | | 370/242 |
| 2016/0342553 A1* | 11/2016 | Hanna | ................... | G06F 3/0607 |
| 2017/0207964 A1* | 7/2017 | Ragupathi | ........... | H04L 41/0668 |
| 2017/0347494 A1* | 11/2017 | Dhote | ................ | H05K 7/20736 |

OTHER PUBLICATIONS

"Troubleshooting thermal issues", https://publib.boulder.ibm.com/infocenter/bladectr/documentation/index.jsp?topic=/com.ibm.bladecenter.advmgtmod.doc/amm_r_troubleshooting_thermal.html, Retrieved on: Jan. 6, 2017, 2 pages.

Ruede, Dave, "IT Team: Want a Temperature Monitoring Device But Don't Know How to Justify It?", http://www.tempalert.com/blog/14-07-15/IT_Team_Want_A_Temperature_Monitoring_Device_But_Don_t_Know_How_To_Justify_It.aspx, Published on: Jul. 15, 2014, 3 pages.

Mulay, Veerendra Prakash, "Analysis of Data Center Cooling Strategies and the Impact of the Dynamic Thermal Management on the Data Center Efficiency", In PhD Dissertations, Mar. 3, 2010, 2 pages.

* cited by examiner

| Scenario / CPU Thermal Excursion Profile 401 | Correlation to Workload, Environmental Conditions, and/or Design Constraints 402 | Mitigation 403 | Resolution 404 |
|---|---|---|---|
| Datacenter-wide CPU thermal excursion | • Datacenter ambient inlet temperature increase<br>• VM workload<br>• Type of datacenter cooling system (e.g. adiabatic) | Improve datacenter ambient inlet temperature control | Improve ambient temperature control ranges (e.g. contain temps below 20C) |
| Cluster-wide CPU thermal excursion | • Datacenter cold location inlet temperature increase<br>• Air handler failure<br>• VM workload<br>• Type of OEM/SKU | Detect air handler failure at datacenter or baseboard management controller firmware defect with ambient temperature | For SKU-specific failures – check for design issues so airflow for CPU can be improved, thermal control redesign |
| Rack-wide CPU thermal excursion | • Airflow blockage under or around rack.<br>• Rack location (e.g. end of cluster where hot and cold aisle meet) | Detect air handler failure for localized failure management | For hot and cold aisle intersection, improve airflow, eliminate airflow blockage |
| Chassis-wide CPU thermal excursion | • Chassis fan failure<br>• Airflow blockage within a chassis<br>• Chassis configuration (e.g. full configuration of server blade slots) | Detect chassis fan failure | Replace chassis fan |
| Isolated thermal excursion for a single CPU in a multi-CPU server | • CPU heat sink improperly installed<br>• Insufficient thermal grease<br>• CPU heat torque issue<br>• VM workload<br>• Server blade slot location | Inspect CPU installation | Reinstall CPU heat sink with increased torque, check thermal grease |
| Isolated thermal excursion on all CPUs within a multi-CPU server | • VM workload<br>• Airflow blockage | Identify cause of airflow blockage or suboptimal airflow (e.g. chassis fan door not closed properly) | Close chassis fan door |

FIG. 4

| 701 | 702 | 703 | 704 | 705 | 706 |
|---|---|---|---|---|---|
| SERVER | CPU TEMPERATURE EXCURSION | MAXIMUM TEMP | TEMP AFTER PROCHOT | TEMP EXCURSION ON CPU0 | TEMP EXCURSION ON CPU1 |
| f1ac957a6f | CPU TEMP EXCURSION OCCURRED 1 TIMES PROCERR ASSERTED: 14 TIMES | 87C | 85C | YES | NO |
| b48e1c7018 | CPU TEMP EXCURSION OCCURRED 1 TIMES PROCERR ASSERTED: 7 TIMES | 87C | 85C | YES | NO |
| 0e802d35063 | CPU TEMP EXCURSION OCCURRED 2 TIMES PROCERR ASSERTED: 16 TIMES | CPU0: 87C CPU1: 87C | CPU0: 88C CPU1: 84C | YES | YES |
| b024215d1a | CPU TEMP EXCURSION OCCURRED 1 TIMES PROCERR ASSERTED: 20 TIMES | 87C | 86C | YES | NO |
| 8b79247c5f | CPU TEMP EXCURSION OCCURRED 1 TIMES PROCERR ASSERTED: 13 TIMES | 87C | 84C | YES | NO |
| 9105d2586c | CPU TEMP EXCURSION OCCURRED 1 TIMES PROCERR ASSERTED: 6 TIMES | 87C | 86C | YES | NO |
| 56517c2881 | CPU TEMP EXCURSION OCCURRED 2 TIMES PROCERR ASSERTED: 15 TIMES | CPU0: 87C CPU1: 87C | CPU0: 83C CPU1: 85C | YES | YES |
| 2a10e4ba6b | CPU TEMP EXCURSION OCCURRED 1 TIMES PROCERR ASSERTED: 17 TIMES | 87C | 88C | YES | NO |
| ee8134ed25 | CPU TEMP EXCURSION OCCURRED 1 TIMES PROCERR ASSERTED: 11 TIMES | 87C | 85C | YES | NO |
| 54f01abc4b | CPU TEMP EXCURSION OCCURRED 1 TIMES PROCERR ASSERTED: 16 TIMES | 87C | 83C | YES | NO |
| 8b79247c5f | CPU TEMP EXCURSION OCCURRED 1 TIMES PROCERR ASSERTED: 10 TIMES | 87C | 84C | YES | NO |

FIG. 7

THERMAL EXCURSION DETECTION IN DATACENTER COMPONENTS

BACKGROUND

A datacenter typically comprises many servers in the form of a large number of racks with server blades, wherein each server has multiple processors or Central Processing Units (CPUs). Due to design and/or environmental issues, the servers may exhibit CPU thermal excursion. If these excursions are not timely detected and addressed, then the datacenter will experience Virtual Machine (VM) disruption and capacity reduction, which negatively impacts mission critical customer applications.

CPU thermal excursions may be caused, for example, by undetected environmental degradations and inadequate airflow due to blockages. These CPU thermal excursions cause undesirable issues in the datacenter, such as VM disruptions, memory latency, capacity loss, wide-spread server impact, degraded performance, unexpected server reboots, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A fully out-of-band, automated process provides centralized, concurrent in-system cluster-level/hyper-scale CPU thermal excursion signature detection based on System Event Log (SEL) content. In one embodiment, a chassis manager within a hyper-scale cluster operates as the initiator of a cluster-level SEL collection and analysis operation. The master chassis manager communicates to other chassis managers within the cluster over a Rest API interface. The master chassis manager initiates a collect and analyze operation, which gets relayed to every chassis manager within the cluster. Every recipient chassis manager then further propagates the collect and analyze operation request to each of the server blades hosted within the chassis.

A Baseboard Management Controller (BMC) on each of the server blades hosted within the chassis receives a cluster SEL read request from the chassis manager of its host chassis through out-of-band communication interfaces. The BMC forwards the SEL data for the server blade to the chassis manager which analyzes the data received from all the servers on the chassis and then sends the results to next manager in the hierarchy. The master chassis manager aggregates results of the hyper-scale collect and analyze operation by collecting responses over the Rest API interface from all chassis manager within the cluster and analyzes the results.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 is a table illustrating example detections and mitigations for various problem scenarios for different CPU thermal excursion profiles.

FIG. 7 illustrates an example table illustrating the type of temperature excursion data that may be collected from each CPU.

DETAILED DESCRIPTION

Figure 1:
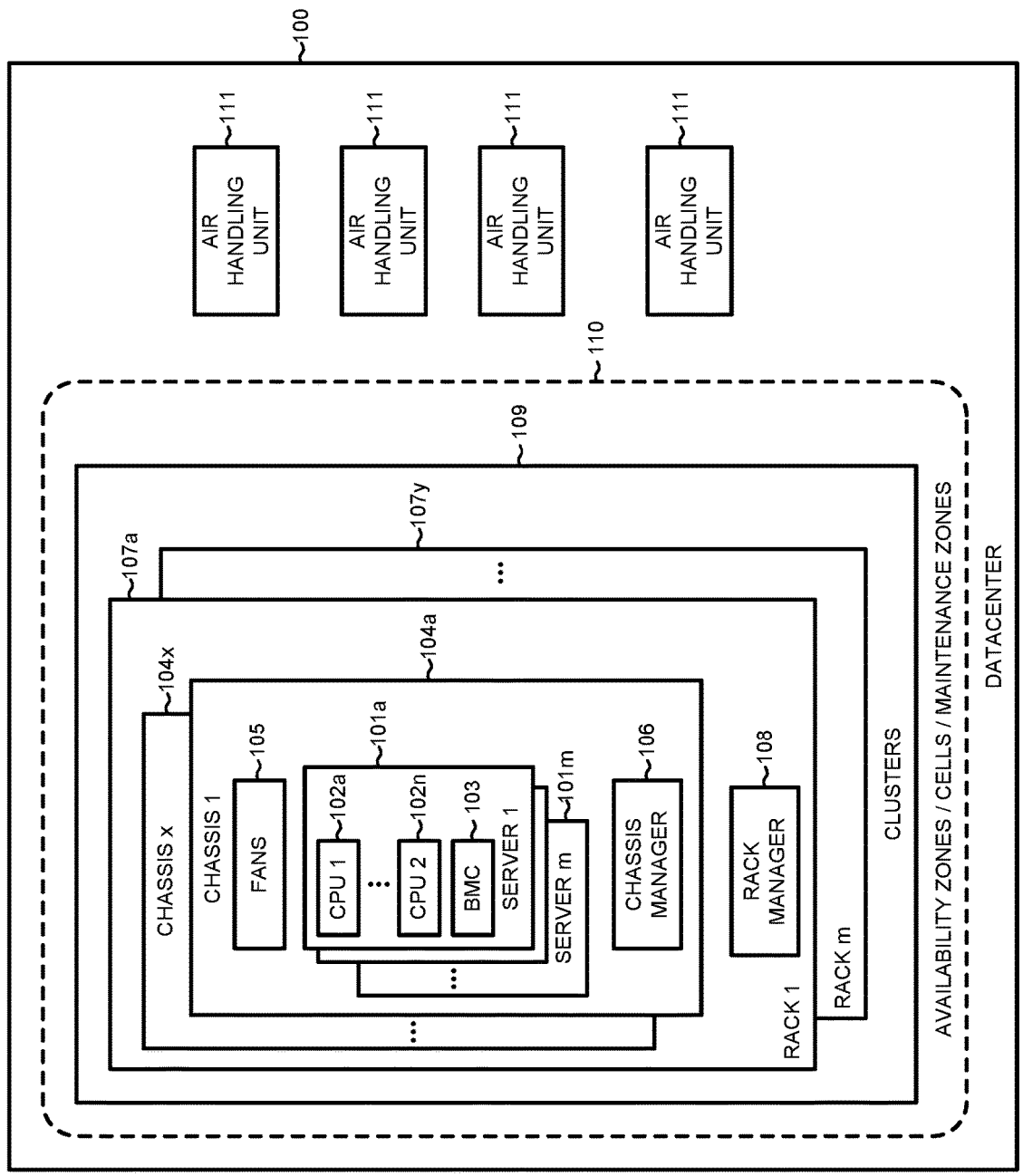
FIG. 1 is a block diagram of a datacenter according to an example embodiment.

FIG. 1 is a block diagram of a datacenter 100 according to an example embodiment. Datacenter 100 comprises hundreds or thousands of servers 101. Each server has n CPUs 102 wherein n is typically a multiple of two so that servers 101 may have two, four, eight, etc. CPUs 102. BMC 103 is a service processor that monitors the state of each server 101. BMC 103 monitors server hardware, retrieves status data, and receives notifications about critical errors and other hardware status changes. BMC 103 measures internal physical parameters, such as temperature, humidity, power-supply voltage, fan speeds, communications parameters, and Operating System (OS) functions. BMC 103 records events to the SEL. Applications that monitor a remote server 101 can obtain data from the server either in-band, through the remote operating system, or out-of-band, directly from BMC 103. BMC 103 provides management and monitoring capabilities independently of the servers' CPUs and OS via the Intelligent Platform Management Interface (IPMI).

Servers 101 may be individually configured as a blade and groups of m such blades are mounted in a chassis 104. For example, in one embodiment a chassis 104 has twenty-four server blades 101. Each chassis 104 has one or more fans 105 to provide cooling airflow to the servers 101 and CPUs 102. A chassis manager 106 controls fans 105 and monitors servers 101 on each chassis.

Groups of chassis 104 are organized in racks 107, wherein each rack 107 comprises x chassis 104. For example, in one embodiment, a rack 107 supports three or four chassis 104. In some embodiments, a rack manager 108 monitors and controls chassis 104 and servers 101 in addition to or in place of chassis manager 106. Racks may be further organized into clusters 109, which may be further organized into a plurality of availability zones, cells, and/or maintenance zones 110 within datacenter 100. A plurality of air handling units 111 provide cooling air to datacenter 100 and may be configured to support particular clusters, availability zones, cells, and/or maintenance zones within datacenter 100.

Cloud service providers may support dozens or hundreds of datacenters worldwide. These datacenters may have varying levels of advancement and design depending upon when they were put in service and which OEMs provide the components (e.g., CPUs, DIMMs, FPGAs) used in the datacenter equipment. As users migrate from on-premises datacenters to the cloud, the monitoring of hyper-scale cloud infrastructure becomes more and more critical. The users' workloads run on virtual machines on the cloud infrastructure, such as illustrated in FIG. 1. CPU thermal excursion in a hyper-scale cluster directly affects the users by causing VMs to be reset, which causes abrupt disruption of user workloads. CPU thermal excursion may be caused by an number of problems, such as, for example, a bad component (e.g. failing CPU), improper mounting (e.g. insufficient thermal glue to attach heat sink, or insufficient torque on install), poor design (e.g. suboptimal airflow in server, chassis, or rack), or environmental conditions (e.g. fan or air handling unit failure, or local temperature rise). There may be thousands of individual CPUs in a cluster and hundreds of thousands of CPUs in a datacenter. Managing and monitoring the hyper-scale cloud server infrastructure can be improved by observing patterns of CPU thermal excursion within the datacenter.

Understanding that failures are expected in a cloud services datacenter, engineers must change their emphasis from designing to extend time between failures to designing to reduce the Time To Recover (TTR) from failures. If failures are expected, the most important objective is to detect the failures quickly and to develop coping strategies that minimize their effects on customers. A Resilience Modeling and Analysis (RMA) methodology for cloud service datacenters prioritizes the areas of detection, mitigation, and recovery from failures, which are significant factors in reducing TTR.

CPU thermal excursions need to be timely detected and addressed or else VM disruption and capacity reduction will result, which impacts critical customer applications. Real-time detection of CPU thermal excursion signatures on a hyper-scale cluster level may be accomplished using a fully out-of-band, automated process. Centralized, concurrent cluster-level and hyper-scale CPU thermal excursions are detected by identifying signatures in the SEL.

Although the example datacenter illustrated in FIG. 1 is organized in terms of CPU, servers, chassis, racks, clusters, etc. It will be understood that other datacenters may be organized in other hierarchical configurations using the same or different names. The systems and methods disclosed herein apply to any datacenter without limitation of the hierarchical naming, control, or management terminology used.

Figure 2:
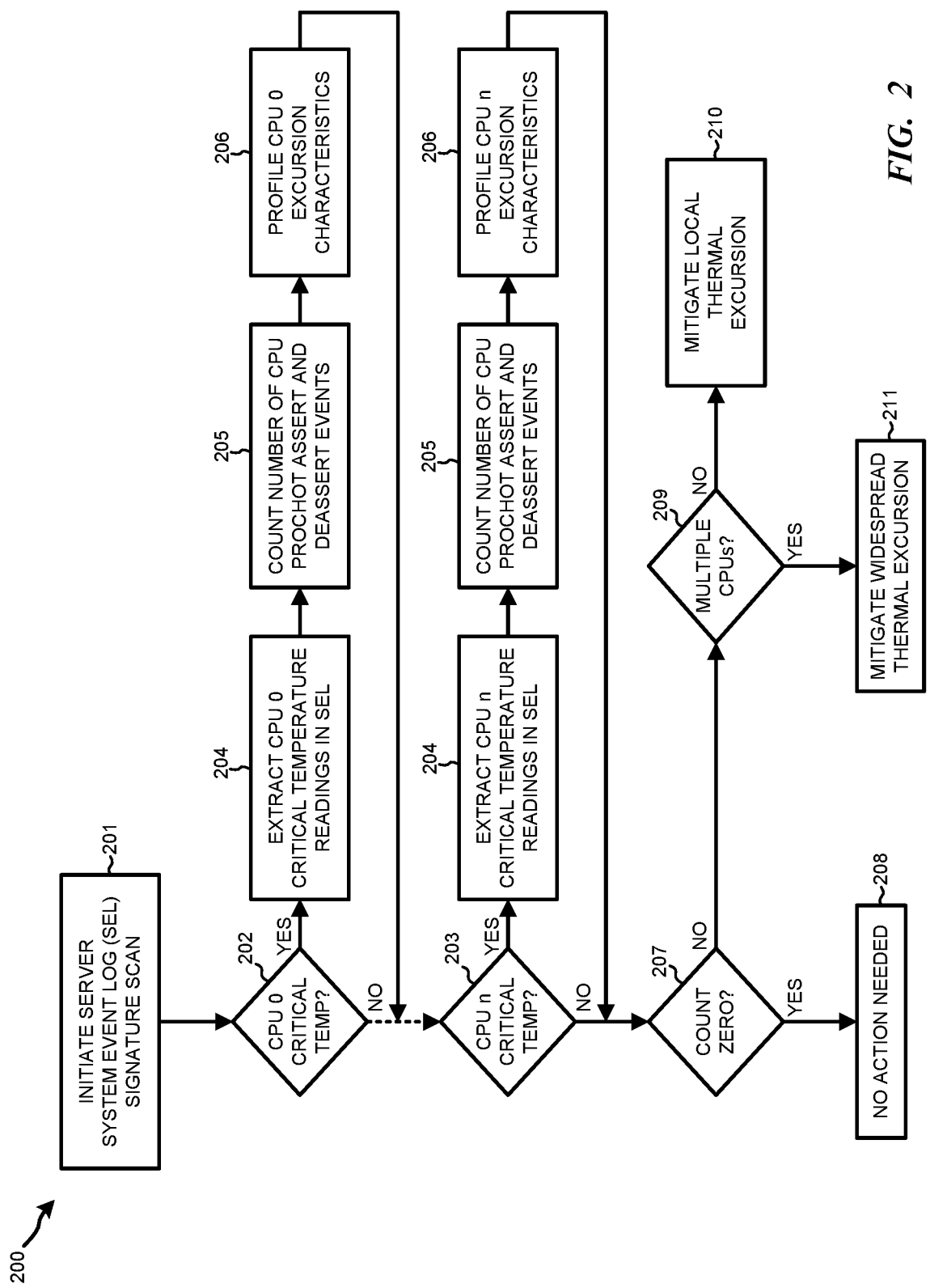
FIG. 2 is a flowchart illustrating an example method for CPU thermal excursion detection at the server level.

FIG. 2 is a flowchart illustrating an example method for CPU thermal excursion detection at the server level. The SEL for a server is a depository for critical events that occur on the server, such as the detection of thermal excursions on a CPU. The server may be a blade having two or more CPUs, which may be labeled from "CPU 0" to "CPU n" (i.e., n+1 total CPUs). The process begins at step 201, wherein a server SEL signature is initiated. In step 202, the process determines whether the signature for CPU 0 has a critical temperature event. If CPU 0 does not have a critical temperature event in step 202, then the process moves to step 203 where the process determines whether the signature for CPU n has a critical temperature event. As indicated by the dashed arrow between steps 202 and 203, the server may have two or more CPUs and the method scales based upon the number of CPUs on the server. The critical temperature event detection step is performed for each CPU. The critical temperature events may be detected using an internal CPU sensor and reported, for example, with a processor hot ("PROCHOT") signal. Alternatively or additionally, the critical temperature events may be detected using external sensors that measure server inlet and outlet air temperatures.

If the signature for CPU 0 has a critical temperature event in step 202, then the process moves to step 204 where the critical temperature readings for CPU 0 are extracted from the SEL. Any time the CPU temperature exceeds a critical temperature, there is an assertion entry that is logged into the SEL by the management controller. There is a corresponding deassert entry logged into the SEL when the CPU temperature drops below the critical temperature. In step 205, the number of times CPU 0 was under temperature excursion is counted. For example, the number of PROCHOT assert and deassert events can be counted. When the CPU overheats, its frequency will be automatically reduced (throttling) to reduce the heat generated by the CPU. In extreme conditions, the SEL may only record an assert of the event and there is no deassert because the server was disrupted so badly that it shut down.

In step 206, a profile of the CPU 0 temperature excursion characteristics is created. The profile may include, for example, the temperature excursion duration, the temperature excursion frequency, throttling, and symmetry (i.e., whether other CPUs on the same server also experienced temperature excursions). After creating the profile in step 206, the process moves on to the next CPU until a profile has been created for all CPUs on the server that had critical temperature events in the SEL. After evaluating CPU n, the process moves to step 207 to evaluate whether one or more CPUs had a critical temperature event. If no CPUs had a critical temperature event (i.e., count=zero), then the process moves to step 208 where it is determined that no action is needed.

On the other hand, if one or more CPUs had a critical temperature event in step 207, then the process moves to step 209 where the process determines if multiple CPUs on the server had a critical temperature event. If only one CPU was affected, then the process moves to step 210 and the system mitigates the local thermal excursion. If multiple CPUs were affected, then the process moves to step 211 and the system mitigates widespread thermal excursion. The method in FIG. 2 can be used to determine whether the CPU temperature excursions are occurring at a local level (e.g., server/blade), or over a more widespread area of the datacenter at a chassis, rack, or colo (cluster, availability zone, cell, or maintenance zone) level.

The process illustrated in FIG. 2 may run on a routine basis and continuously. For example, every few seconds a task may initiate on the server baseboard management controller to run a self-signature scan. The signature profile from each server baseboard management controller may then be reported to their respective chassis manager, which in turn may report to a higher level controller in a rack or cluster.

Figure 3:
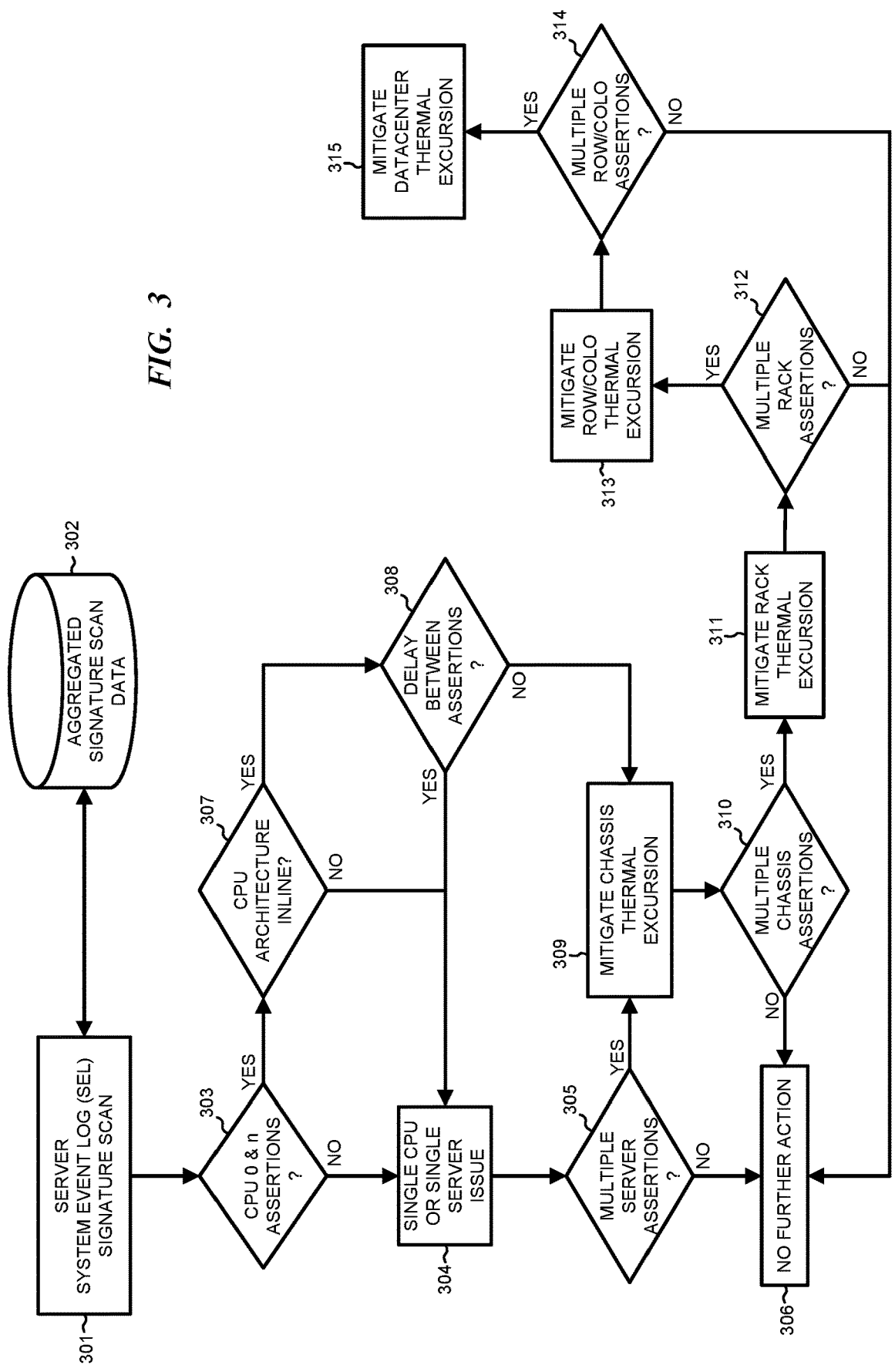
FIG. 3 is a flowchart illustrating an example method for dynamic detection of the scope of CPU thermal excursion in a hyper-scale environment.

FIG. 3 is a flowchart illustrating an example method for dynamic detection of the scope of CPU thermal excursion in a hyper-scale environment. In step 301, a scan of the SEL signature for all of the CPUs in a datacenter is initiated. Data collected in the signature scan can be saved to a database 302, or stored data from database 302 can be used in the signature scan. For each server with a CPU temperature excursion (e.g., PROCHOT assertion), a determination is made in step 303 whether more than one CPU experienced a temperature excursion. If only one CPU overheated, then it is likely that the temperature excursion is an issue with just a single CPU or server and the process moves to step 304 to mitigate server temperature excursions. In step 305, the process determines whether multiple servers experienced CPU temperature excursions. If multiple servers have not experienced CPU temperature excursions, then the process moves to step 306 and no further action is required because the problem is limited to a single CPU or server in a chassis. Alternatively, if multiple servers do experience CPU temperature excursions, then the problem is likely at the chassis level and the process moves to step 309.

Returning to step 303, if two or more CPUs on the same server experienced a temperature excursion, then the process moves to step 307 where the server architecture is evaluated regarding the CPU configuration. If it is determined in step 307 that the CPUs are not arranged inline, then the process moves to step 304 and continues as described above. Alternatively, if the CPUs are arranged inline at step 307, then the process moves to step 308 to evaluate if there is a delay between the temperature excursions between CPU 0 and CPU n. If there is a delay in when the CPU PROCHOT assertions occur on the same server, then the overheating is likely a single server issue and the process moves to step 304.

If there is no delay in when the CPU PROCHOT assertions occur on the same server in step 308 (i.e., two or more CPUs overheat simultaneously or at approximately the same time), then the problem is likely at the chassis level and the process moves to step 309 to mitigate chassis level thermal excursions. In step 310 the process evaluates whether there have been multiple chassis with temperature excursion assertions. If the issues are limited to a single chassis in step 310, then the process moves to step 306 and no further action is required because the chassis mitigation in step 309 has addressed the problem.

If multiple chassis have CPU temperature excursion assertions in step 310, then the process moves to step 311 to mitigate rack level temperature excursions. In step 312 the process evaluates whether there have been multiple racks with CPU temperature excursions. If the issues are limited to a single rack in step 312, then the process moves to step 306 and no further action is required because the chassis mitigation in step 309 has addressed the problem.

If multiple racks have CPU temperature excursion assertions in step 312, then the process moves to step 313 to mitigate row or colo level temperature excursions. In step 314 the process evaluates whether multiple rows of racks or racks within the same colo have CPU temperature excursions. If the issues are limited to a single row or colo in step 314, then the process moves to step 306 and no further action is required because the row/colo mitigation in step 313 has addressed the problem. On the other hand, if multiple rows/colo have CPU temperature excursion assertions in step 314, then the process moves to step 315 to mitigate temperature excursions across the entire datacenter.

The methods illustrated in FIGS. 2 and 3 can be used across every server in the datacenter to provide a massive detection capability. The profile of CPU thermal excursion allows datacenter management and maintenance personnel to evaluate several aspects of the system when a thermal excursion occurs. One aspect is how long does the thermal excursion last. For example, if a thermal excursion impacts one or both CPU 0 and CPU 1, does it last for just a few seconds? i.e. is it short-lived? Or does the temperature excursion last minutes or hours or days? Depending upon the root cause, instances of thermal excursions may last for long periods, such as weeks. Another aspect to consider is the frequency of the thermal excursion or how often it happens, which affects how disruptive the overtemperature condition is. Every time the CPU has a thermal excursion, the condition disrupts not only the CPU performance but if it happens with a high frequency, then the thermal excursion may cause the server to shut down as well. Additionally, the throttling and symmetry aspects of the thermal excursions are considered. Throttling is a reduction in the CPU clock to slow operations in an effort to cool the CPU. Symmetry detects whether both CPU 0 and CPU 1 are being impacted identically, or if the CPUs are impacted only one at a time.

By profiling CPU data from a large collection of servers, patterns may be observed and correlated to different conditions. For example, certain individual or widespread patterns may indicate that a CPU's heat sink is not properly installed, such as having insufficient thermal glue. Other patterns may indicate that a chassis or rack fan has failed or that local area environmental conditions (e.g., outside air temperature) has risen. The processes collect the critical temperature data from the CPU/server level and build upwards. From the server level, a profile of the entire chassis can be created. Then from the chassis data, a profile for the entire rack can be created. From the rack level, a profile the cluster can be built, and from the cluster the profile of various datacenter zones are created.

FIG. 4 is a table 400 illustrating example detections and mitigations for various problem scenarios for different CPU thermal excursion profiles. Column 401 lists observed CPU thermal excursion profiles based upon the SEL signature scan. Column 402 lists possible correlations to workload, environmental conditions, and/or design constraints for the respective thermal excursion profiles in column 401. Column 403 lists possible mitigation actions that datacenter personnel might employ for a given thermal excursion profile. Column 404 lists possible resolutions for the example thermal excursion profiles.

As illustrated by the examples in table 400, different CPU thermal excursion scenarios correlate to different workload, environmental, and design constraints. The mitigation column shows the various mitigations that be used to detect the source of the different thermal excursion problems. The resolution column provides immediate and/or long term fixes to the problem. For example, an improperly installed CPU can be reinstalled or a failed chassis fan can be replaced. Server, chassis, and rack design improvements can also be identified, such as the need for improved airflow across a server blade or the need to redesign the thermal control for air handler units serving individual clusters. The symmetry of the critical temperature events whether across individual CPUs in a server or servers in a chassis may provide a general indication of the source of the problem. If a critical temperature is occurring on just one CPU, the cause is more likely to be either a heat sink or an improper thermal glue issue or may be an airflow blockage on the blade itself. But critical temperatures that affect servers symmetrically more likely require mitigation and detection for environmental improvements. Table 400 is just a sample of an entire system of thermal excursion detections and mitigations that can be employed in a datacenter. Variations in CPU profiles, such as changes in duration, frequency, throttling, and symmetry, on a datacenter-wide to an individual server level may result from different root causes and may require different mitigations and resolutions.

Figure 5:
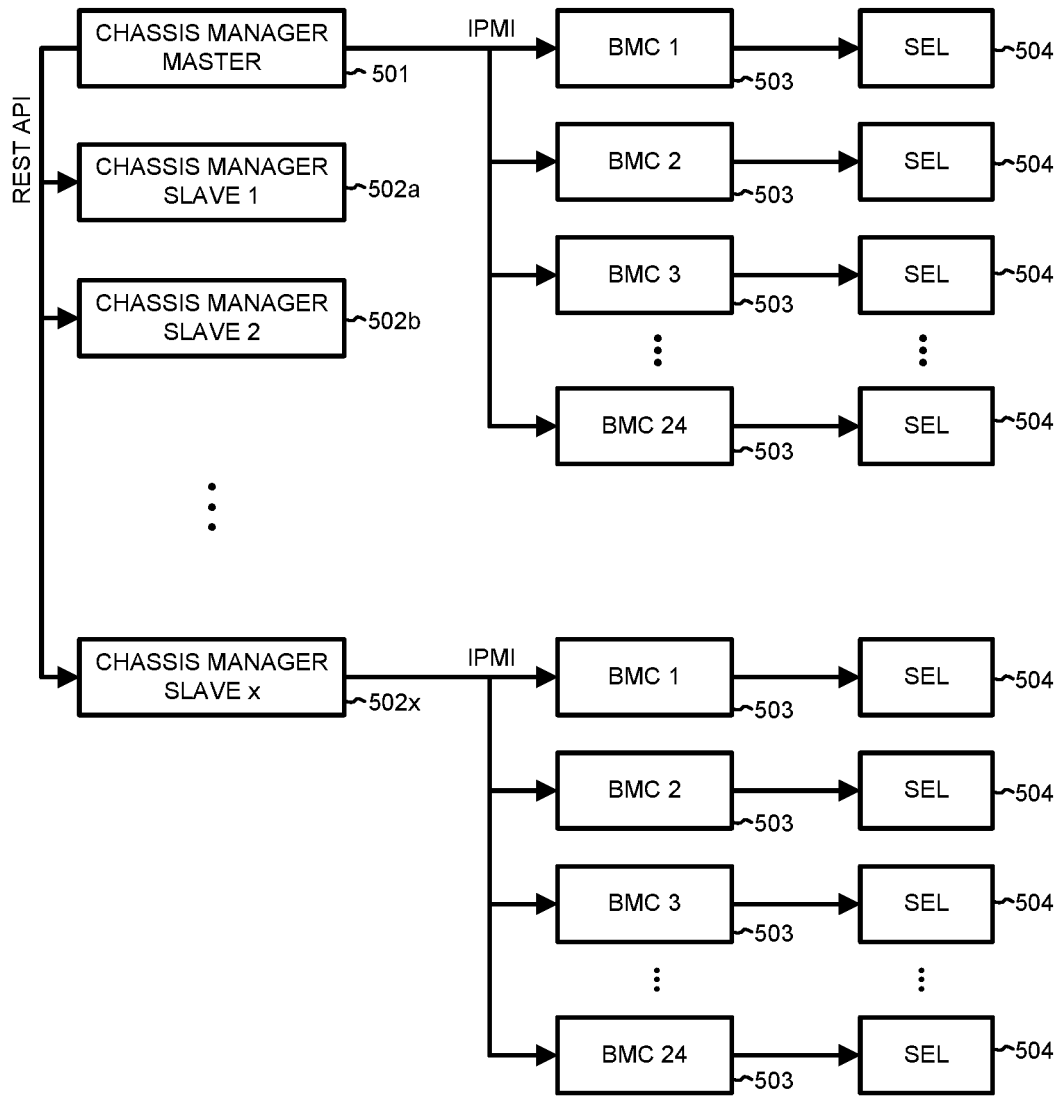
FIG. 5 illustrates an example process for collecting and analyzing SEL critical temperature information at the cluster level.

FIG. 5 illustrates an example process for collecting and analyzing SEL critical temperature information at the cluster level. In one embodiment, a cluster may comprise x chassis, such as fifty-four chassis. Each chassis comprises twenty-four servers and a chassis manager 501, 502. Each server has a BMC 503 with a respective SEL 504. One of the chassis managers within the cluster operates as the initiator of the hyper-scale cluster-level SEL collect and analyze operation and the chassis managers act as slaves. Master chassis manager 501 communicates to the other chassis managers 502 within the cluster over a Rest API interface. Master chassis manager 501 initiates the collect and analyze operation by sending an SEL read request, which gets relayed to every other chassis managers 502 within the cluster over the Rest API interface. Master chassis manager 501 and every recipient chassis manager 502 then further propagates the SEL read request on the IPMI interface to each of the server blades hosted within the chassis.

BMCs 503 on each of the server blades within the chassis receives the SEL read request from the chassis manager of the host chassis through the out-of-band IPMI communication interface. BMCs 503 forwards the requested SEL data for each server blade to the respective chassis manager 501, 502, which analyzes the data received from all the server blades and send its results to next chassis manager in the hierarchy. Master chassis manager 501 aggregates the results of the hyper-scale collect and analyze operation by collecting responses over Rest API interface from all chassis managers 502 within the cluster and analyzes the results. This method may collect and analyze SEL content for CPU thermal excursions, for example, irrespective of the host OS's operational status since the communication is all out-of-band.

Figure 6:
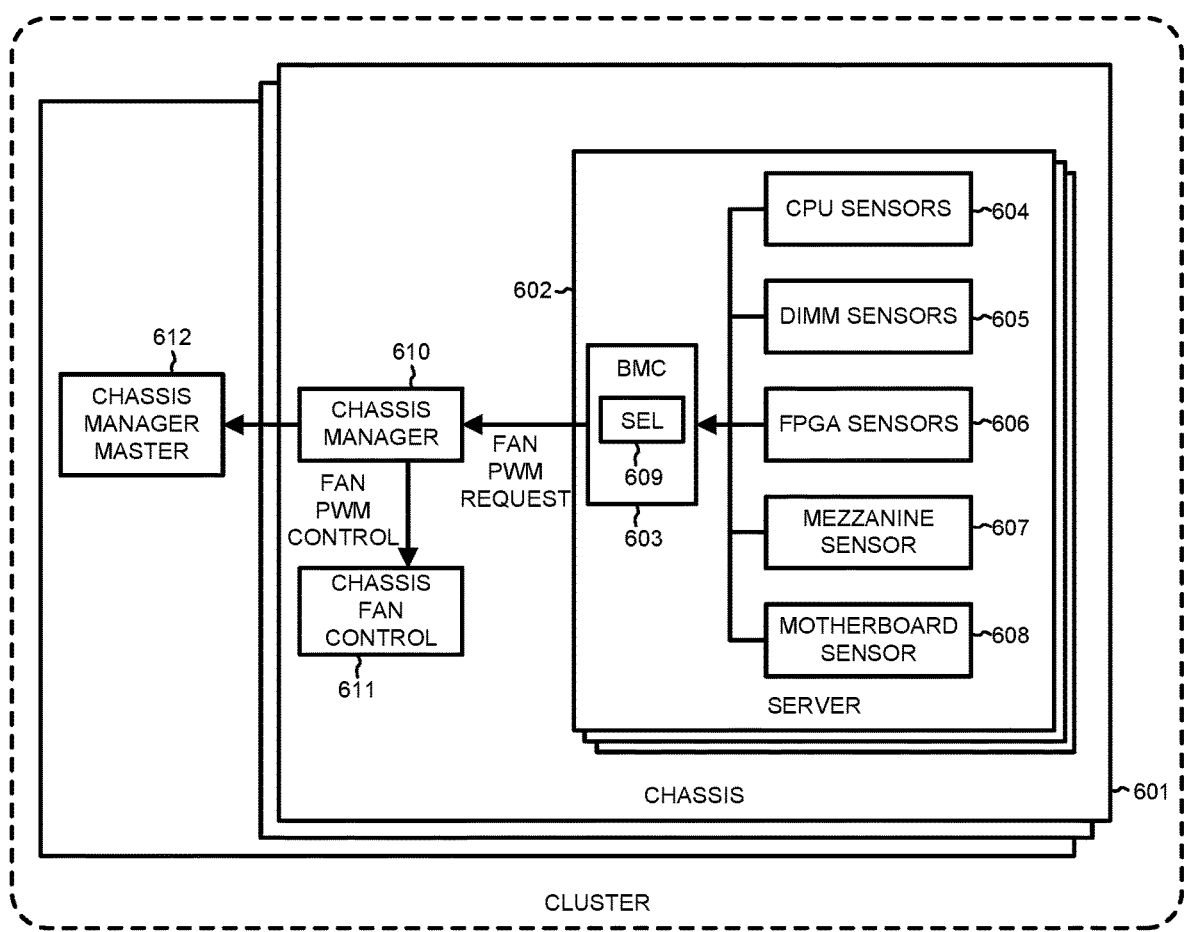
FIG. 6 is a block diagram illustrating how temperature data may be collected and used in one embodiment.

FIG. 6 is a block diagram illustrating how temperature data may be collected and used in one embodiment. A chassis 601 hosts a plurality of server blades 602. Each server has a baseboard management controller 603. Additionally, server 602 may have other components, such as CPUs, DIMMS, FPGAs, mezzanine cards, and/or a motherboard. Each of these components may have a temperature sensor 604-608 or other temperature reporting capability. Although the examples above were directed to analyzing critical temperatures in CPUs, it will be understood that the same methods of temperature data collection and analysis may also be applied to any other server component. BMC 603 collects temperature data from server components, such as critical temperature events from a CPU sensor 604, and records the data as events in SEL 609.

Periodically or in response to a SEL read request, BMC 603 sends critical temperature data to chassis manager 610. Chassis manager 610 may use that data, for example, to adjust chassis fan control 611. Chassis manager 610 may also send the critical temperature data to a chassis manager master 612 for the cluster. This method of collecting critical temperature data enables thermal control improvements both at a local chassis level and at the cluster level or above.

BMC 603 may collect temperature readings and temperature thresholds and may adjust the rate of reading the data from temperature sensors 604-608. That information may be used to generate a chassis fan PWM (Pulse-Width Modulation) request (i.e., a cooling request) from BMC 603 to chassis manager 610, which may in turn generate a fan PWM control signal to chassis fan control 611. The thermal data from BMC 603 may cause the chassis manager to change the fan PWM, adjust the rate of PWM ramp-up, and/or monitor the fan RPM. The rate of temperature sensor collection by BMC 603 and the rate of fan PWM request collection by chassis manager 610 determines the maximum latency for the temperature sensor reading's impact on fan control. For example, if sensor readings are collected every ten seconds and fan PWM requests are collected every 10 seconds, the maximum latency is twenty seconds.

The SEL thermal excursion collection and analysis operations described above enable mitigation of thermals issues and improves thermals control within the datacenter. When temperature excursions are observed, the chassis manager master can take progressively higher action depending upon how widespread the temperature excursions are occurring. Temperature excursions that are occurring only on one server indicate a localized issue, such as a problem with CPU thermal grease, heat sink, or torque. If temperature excursions that are occurring across multiple servers in a chassis, then that indicates a chassis level problem, such as fan control, fan door, or airflow problem. If temperature excursions that are occurring across multiple chassis in a cluster, then that indicates a cluster or higher level problem, such as environmental issues or an increase in the local area temperature.

By looking at the patterns of temperature excursion data across thousands of servers, the datacenter service provider can perform Root Cause Analysis (RCA) to identify design, environmental, and/or manufacturing factors that cause the temperature excursions. Over time, the temperature excursion data can be analyzed to identify design problems to be addressed with OEMs, such as modifications to the server motherboard layout, updates to fan control software, and/or changes to the datacenter design roadmap. Additionally, updates and changes to troubleshooting guides can be identified based upon the correlation of certain temperature excursions to successful mitigations.

FIG. 7 illustrates an example table 700 illustrating the types of data that may be collected from each CPU in a server and reported from the BMC to the chassis manager and/or from the chassis manager slave to a master. Such temperature excursion information can be aggregated at each level—server, chassis, rack, etc.—and passed to a higher-level controller in the datacenter hierarchy. Only servers with temperature excursions during a reporting period are listed. There is no need to pass on acceptable temperature data. Column 701 lists a plurality of server identifiers. Any appropriate server identifier may be used based upon the naming/addressing convention used in the datacenter. Column 702 indicates how many times a temperature excursion occurred on the server. Column 702 also indicates how many times a processor error was asserted on the server during the reporting period.

Column 703 lists the maximum CPU temperature achieved by one or more CPUs on the server. Column 704 indicates the CPU temperature that was achieved after throttling, which is initiated by PROCHOT assertion. Columns 703 and 704 may indicate an actual temperature measured, a relative temperature, or a delta relative to a reference temperature. Columns 705 and 706 indicate whether the temperature excursion was observed on CPU 0 or CPU 1. It will be understood that the same information may be collected for servers having more than two CPUs by adding additional columns.

The information in table 700 can be analyzed to identify patterns and to apply appropriate mitigations. For example, if many of the listed servers are located in the same chassis, that may indicate an equipment issue such as a cooling fan failure. Alternatively, if many of the servers are located across the same cluster, that may indicate an environmental issue, such as an increase in outside air temperature. The entries in rows 707 and 708 indicate that those servers experienced temperature excursions on both CPUs. Information regarding these servers may be analyzed to determine if a design flaw is causing servers of that type to experience CPU thermal excursions in addition to or instead of equipment and environmental issues. Appropriate mitigations can be applied both immediately and in the future, such as repairing equipment, updating fan control software, improving the design of future servers, etc.

An example distributed computing system comprises one or more groups each comprising a plurality of chassis, each chassis comprising a chassis manager and a plurality of servers, each server comprising a baseboard management controller and a plurality of processors; each baseboard management controller configured to monitor the plurality of processors on its respective server and to store processor thermal events to a local system event log; a chassis manager master configured to initiate a thermal event collection operation on all chassis within a group by sending a collection request to other chassis managers within the group; and each chassis manager configured to receive thermal event data from the local system event logs on each baseboard management controller on its respective chassis and to forward the thermal event data to the chassis manager master.

The example distributed computing may further comprise each chassis manager being configured to relay the collection request to each baseboard management controller on its respective chassis via out-of-band communication.

The out-of-band communication in the example distributed computing system may be conveyed over an Intelligent Platform Management Interface (IPMI).

The distributed computing system may further comprise each chassis manager being configured to analyze the thermal event data from the local system event logs and to initiate mitigation for thermal events on its respective chassis.

The mitigation in the example distributed computing system may comprise controlling a cooling fan.

The distributed computing system may further comprise the chassis manager master being configured to analyze the thermal event data from the local system event logs from chassis within its group and to initiate mitigation for thermal events within the group.

The distributed computing system may further comprise the chassis manager master being configured to aggregate the thermal event data from the local system event logs from chassis within its group and to forward the aggregated thermal event data for the group to a higher-level controller within a datacenter hierarchy.

The aggregated thermal event data in the example distributed computing system may be used to isolate a server problem at a blade, chassis, rack, colo, or datacenter level.

The aggregated thermal event data in the example distributed computing system may be analyzed to correlate a hardware inventory to thermal events on a server.

The aggregated thermal event data in the example distributed computing system may be analyzed to detect a scope of thermal excursions across regions of the datacenter.

The mitigations to address thermal excursions identified from the aggregated thermal event data may be selected depending on the scope of thermal excursions in the example distributed computing system.

An example method comprises initiating, by a chassis manager master among a plurality of chassis managers, a thermal event collection operation on all chassis within a group by sending a collection request to the chassis managers within the group; relaying, by each chassis manager, the collection request to each baseboard management controller on its respective chassis via out-of-band communication; and forwarding, by each chassis manager, thermal event data received from local system event logs on each baseboard management controller to the chassis manager master.

The out-of-band communication in the example method may be conveyed over an Intelligent Platform Management Interface (IPMI).

The method further comprising analyzing, by each chassis manager, the thermal event data from the local system event logs and to initiate mitigation for thermal events on its respective chassis.

The mitigation in the example method may comprise controlling a cooling fan.

The method further comprising analyzing, by the chassis manager master, the thermal event data from the local system event logs; and initiating mitigation for thermal events within the group.

The method further comprising aggregating, by the chassis manager master, the thermal event data from the local system event logs; and forwarding the aggregated thermal event data for the group to a higher-level controller within a datacenter hierarchy.

The method further comprising using the aggregated thermal event data to isolate a server problem at a blade, chassis, rack, colo, or datacenter level.

The method further comprising analyzing the aggregated thermal event data to correlate a hardware inventory to thermal events on a server.

The method further comprising analyzing the aggregated thermal event data to detect a scope of thermal excursions across regions of the datacenter; and selecting mitigations to address thermal excursions identified from the aggregated thermal event data based on the scope of thermal excursions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A distributed computing system, comprising:
one or more groups each comprising a plurality of chassis, each chassis comprising a chassis manager and a plurality of servers, each server comprising a baseboard management controller and a plurality of processors;
each baseboard management controller configured to monitor the plurality of processors on its respective server and to store processor thermal events to a local system event log;
a chassis manager master configured to initiate a thermal event collection operation on all chassis within a group by sending a collection request to other chassis managers within the group; and
each chassis manager configured to, in response to the collection request, receive thermal event data from the local system event log on each baseboard management controller on its respective chassis and forward the thermal event data to the chassis manager master, wherein the chassis manager master is configured to receive the thermal event data from each chassis manager and aggregate the thermal event data from each chassis manger to build a thermal excursion profile identifying a presence of a temperature excursion of the group,
wherein the chassis manager is configured to adjust a level of mitigation for the temperature excursion based on how widespread the temperature excursion is across the group.

2. The distributed computing system of claim 1, further comprising:
each chassis manager configured to relay the collection request to each baseboard management controller on its respective chassis via out-of-band communication.

3. The distributed computing system of claim 2, wherein the out-of-band communication is conveyed over an Intelligent Platform Management Interface (IPMI).

4. The distributed computing system of claim 1, further comprising:
each chassis manager configured to analyze the thermal event data from the local system event log and to initiate mitigation for thermal events on its respective chassis.

5. The distributed computing system of claim 4, wherein the mitigation comprises controlling a cooling fan.

6. The distributed computing system of claim 1, further comprising:
the chassis manager master configured to analyze the thermal event data from the local system event logs from the plurality of chassis within its group and to initiate mitigation for thermal events within the group.

7. The distributed computing system of claim 1, further comprising:
the chassis manager master configured to aggregate the thermal event data from the local system event logs from the plurality of chassis within its group and to forward the aggregated thermal event data for the group to a higher-level controller within a datacenter hierarchy.

8. The distributed computing system of claim 7, wherein the aggregated thermal event data is used to isolate a server problem at a blade, chassis, rack, colo, or datacenter level.

9. The distributed computing system of claim 7, wherein the aggregated thermal event data is analyzed to correlate a hardware inventory to thermal events on a server.

10. The distributed computing system of claim 7, wherein the aggregated thermal event data is analyzed to detect a scope of thermal excursions across regions of a datacenter.

11. The distributed computing system of claim 10, wherein mitigations to address thermal excursions identified from the aggregated thermal event data are selected depending on the scope of thermal excursions.

12. The distributed computing system of claim 1, wherein the chassis manager master is further configured to identify, based on the thermal excursion profile of the group and one or more additional thermal excursion profiles of the group, one or more patterns.

13. The distributed computing system of claim 1, wherein the level of mitigation changes a design of a datacenter or addresses area environmental conditions.

14. A method, comprising:
initiating, by a chassis manager master among a plurality of chassis managers, a thermal event collection operation on all chassis within a group by sending a collection request to the plurality of chassis managers within the group;
relaying, by each of the plurality of chassis managers, the collection request to each baseboard management controller on its respective chassis via out-of-band communication; and
forwarding, by each of the plurality of chassis managers, thermal event data received from local system event logs on each baseboard management controller to the chassis manager master;
determining, by the chassis manager master and based on the thermal event data received from the local system event logs, a presence of a temperature excursion on two or more chassis within the group; and
mitigating, by the chassis manager, the temperature excursion across the group based on the presence of the temperature excursion on the two or more chassis.

15. The method of claim 14, wherein the out-of-band communication is conveyed over an Intelligent Platform Management Interface (IPMI).

16. The method of claim 14, further comprising:
analyzing, by each chassis manager, the thermal event data from the local system event logs and to initiate mitigation for thermal events on its respective chassis.

17. The method of claim 16, wherein the mitigation comprises controlling a cooling fan.

18. The method of claim 14, further comprising:
analyzing, by the chassis manager master, the thermal event data from the local system event logs; and
initiating mitigation for thermal events within the group.

19. The method of claim 14, further comprising:
aggregating, by the chassis manager master, the thermal event data from the local system event logs; and
forwarding the aggregated thermal event data for the group to a higher-level controller within a datacenter hierarchy.

20. The method of claim 19, further comprising:
using the aggregated thermal event data to isolate a server problem at a blade, chassis, rack, colo, or datacenter level.

21. The method of claim 19, further comprising:
analyzing the aggregated thermal event data to correlate a hardware inventory to thermal events on a server.

22. The method of claim 19, further comprising:
analyzing the aggregated thermal event data to detect a scope of thermal excursions across regions of a datacenter; and
selecting mitigations to address thermal excursions identified from the aggregated thermal event data based on the scope of thermal excursions.

* * * * *